Oct. 1, 1957     C. R. SACCHINI     2,807,823

ELECTRIC MOTOR DRIVEN WINDSHIELD WIPER MECHANISMS

Filed March 7, 1956     2 Sheets-Sheet 1

INVENTOR.
COLUMBUS R. SACCHINI
BY
ATTORNEY

Oct. 1, 1957 C. R. SACCHINI 2,807,823
ELECTRIC MOTOR DRIVEN WINDSHIELD WIPER MECHANISMS
Filed March 7, 1956 2 Sheets-Sheet 2
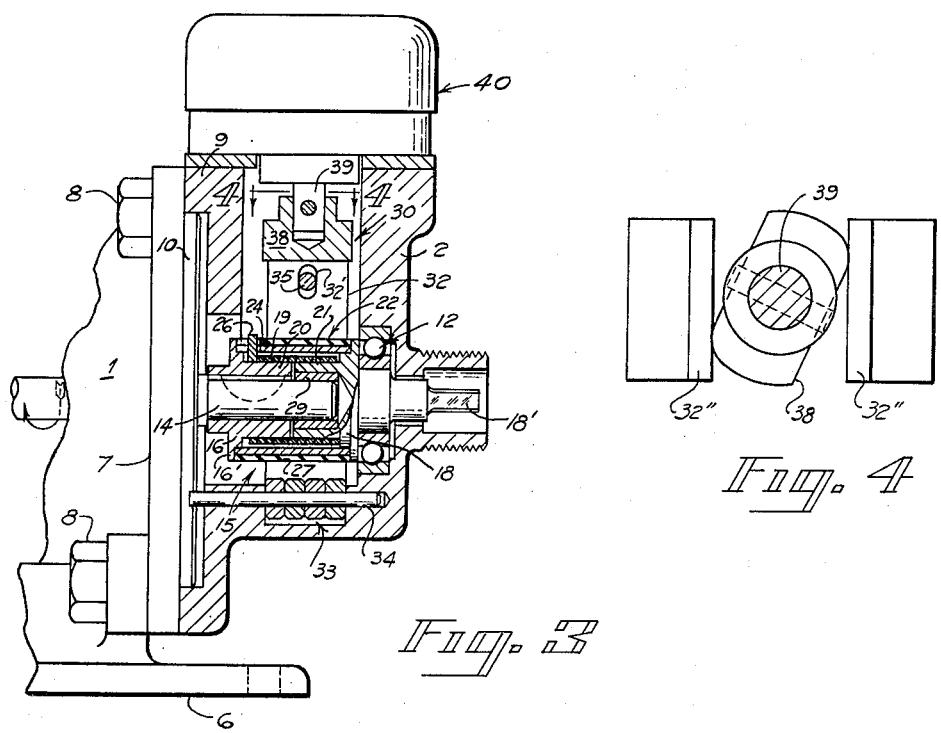
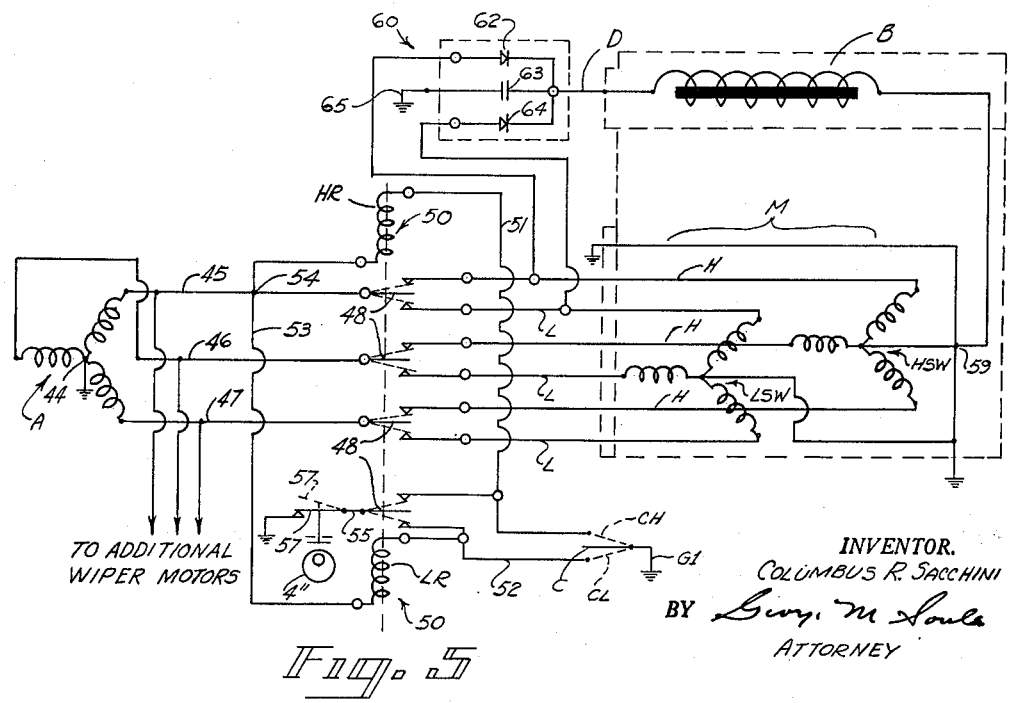
INVENTOR.
COLUMBUS R. SACCHINI
BY George M. Soule
ATTORNEY

United States Patent Office 2,807,823
Patented Oct. 1, 1957

2,807,823

ELECTRIC MOTOR DRIVEN WINDSHIELD WIPER MECHANISMS

Columbus R. Sacchini, Willoughby, Ohio, assignor to Curtiss-Wright Corporation, New York, N. Y., a corporation of New York Application March 7, 1956, Serial No. 570,060

4 Claims. (Cl. 15—253)

The invention relates to an electric motor driven windshield wiper mechanism and control system therefor. The herewith illustrated arrangement was designed for heavy duty windshield wiping use on aircraft in which the various auxiliary or accessory motor equipment necessary for flight and landing consists of high speed, induction motor mechanisms using relatively high frequency and high voltage alternating current (e. g. 400 cycle 208 volt current by the use of which relatively light weight motors turning at speeds in the magnitude of 10,000 R. P. M. replace the more massive and sometimes less dependable direct current motor powered electrical accessory equipment formerly common on aircraft).

An important problem in connection with using high speed alternating current induction motors for heavy duty aircraft windshield wiping is that of parking the wiper blades precisely in the desired positions out of their normal fields of operation. One solution or proposed solution to the problem is disclosed by C. R. Sacchini Patent 2,528,181 issued to the assignee of the present application October 31, 1950. Therein, a high speed reversible alternating current motor is employed for driving a wiper blade through suitable speed reduction gearing; the parking control manual operation electrically conditions the motor for reverse rotation, and actual reversal of motor rotation is prevented from taking place through operation of a one way acting, self energizing friction brake applied to a motor-rotor-connected part. When parking of heavy duty wiper blades is attained in that manner the overcoming of large inertia forces is involved and the wiper shutdown and parking operations can be temporarily accompanied by considerable heating of the motor windings unless special means (shown by said patent) are provided to insure timely de-energization of the motor following establishment of reversing connections. Additionally, if more than one wiper operating speed is necessary, then either the wiper reduction gearing or the electrical control mechanisms become quite complicated and/or unduly large and massive for use on aircraft.

The present solution, generally, is to provide a plural speed alternating current induction motor for each wiper installation or unit, to provide an overrunning friction clutch between the motor rotor and the necessary reduction gearing and/or motion converter mechanism leading to the wiper blade or blades, and an automatic, electrically operated de-energizer for the clutch, the mechanism being so arranged and controlled that the operator or operators of the aircraft can, as a result of a single easily effected manual shutdown-initiating operation, stop the motion of the wiper or wipers precisely in the desired parking position or positions. The controls are such that, when the motor is de-energized its rotor is allowed to "coast" until stopped gradually by relatively small friction forces.

Preferably, and as illustrated herewith, the invention provides a light weight self energizing helical spring or coil type friction clutch between a plural speed alternating current electric motor and relatively high reduction gearing leading to the wiper or wipers, a spring-force-operated friction brake arranged for and capable of de-energizing the clutch without imposing shock loading upon the clutch or connected parts, and a direct current solenoid operated mechanism which holds the brake released only so long as the electric motor is being supplied with operating current. Thus the shutdown operation, initiated manually, and cyclically further controlled according to wiper position to interrupt current to the electric motor at proper times, results in accomplishment of precise position parking of the wiper or wipers without imposition of destructive strains on mechanical parts or adverse conditions on the electric power mechanism.

Other objects and features of the invention will be explained in the following description in reference to the accompanying drawings, wherein:

Fig. 1 is a small scale assembly view showing a casing 1 (of wiper operating electric motor M described below) arranged to support a clutch and brake mechanism housing 2 and one end portion of a flexible shaft assembly 3 leading to a reduction gearing unit 4 adjacent the windshield (not shown). Assuming the unit 4 contains a suitable form of motion converting mechanism, the wiper W connected with output shaft 4' of unit 4 will be driven with alternate rotary motion.

Figs. 2 and 3, respectively, are larger scale transverse and longitudinal sectional detail views of the clutch and brake mechanisms 15 and 30 hereof respectively, the plane of Fig. 2 being indicated at 2—2 on Fig. 1, and the plane of Fig. 3 being indicated at 3—3 on Fig. 2.

Fig. 4 is a sectional detail view of a brake applying cam, the plane of this view being indicated at 4—4 on Fig. 3.

Fig. 5 is an electrical diagram, showing, conventionally, a polyphase induction motor M having separate low and high speed windings LSW and HSW respectively, and circuit connections for control of the motor.

Figure 1:
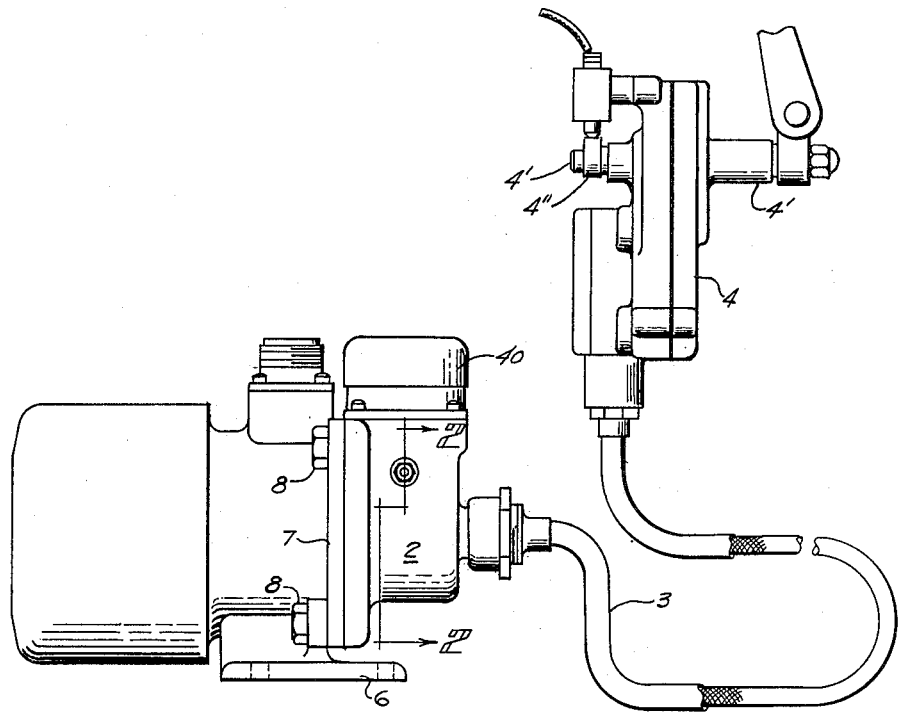
Figure 2:
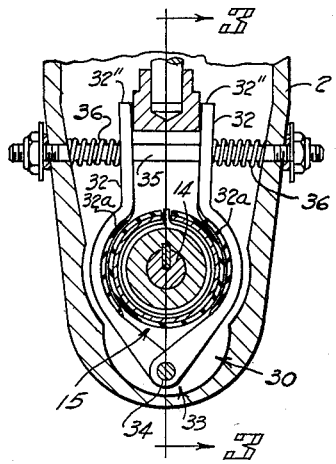

Referring first to Figs. 1, 2 and 3, the motor casing 1 has a supporting or mounting base portion 6 and laterally projecting flange portions 7 (one shown) to which brake and clutch mechanism housing 2 is firmly attached by suitable screws 8. Mounting face or flange portion 9 of brake and clutch mechanism housing 2 accurately fits over a short circular extension 10 on the motor casing 1 and holds an antifriction bearing assembly 12 of housing 2 accurately aligned with the rotor of motor M, the rotor being represented in Figs. 2 and 3 by an end portion 14 of its output shaft which portion projects into housing 2.

The clutch mechanism 15, as shown, is a spring or coil clutch assembly comprising a driving clutch drum member 16 suitably keyed to motor shaft portion 14; a driven clutch drum member 18 supported for free rotation in bearing assembly 12 and having a portion 18' for connection to the flexible shaft (not shown) of assembly 3; a helical clutch spring 19 enveloping clutch drum surface portions 20 and 21 of drum members 16 and 18 in frictional contact therewith, and a rotary clutch control sleeve assembly 22 which includes the clutch spring 19. Control sleeve and clutch spring assembly 22 comprises in part, a cylindrical light weight metal sleeve member 24 supported for free angular movement on and relative to the clutch drum members 16 and 18 as will be evident from Fig. 3, the sleeve member 24 surrounding the clutch spring 19 and being attached to a de-energizing end portion of the clutch spring. The left hand end of sleeve member 24, as shown in Fig. 3, is axially recessed at 25, adjacent a sleeve-position-retaining flange portion 16' of clutch member 16, loosely to receive a control lug 26 of the clutch spring 19. The lug is formed, for example, as a radially outwardly bent terminal portion of the driving-drum-associated end coil of the clutch spring. The various coils of clutch spring 19 are formed on such diameters as to be radially preloaded to some extent against the associated drum surfaces 20 and 21 of the clutch drum members (interference fitted thereon) so that the clutch spring will be self energizing strongly to couple the driven drum member 18 to the driving drum member 16 for rotation of member 18 thereby in one rotational direction only. The control sleeve and clutch spring assembly 22 further comprises a synthetic rubber or other high friction surface affording sleeve portion 27 bonded to the metal sleeve member 24.

The clutch spring 19 is coiled in the proper direction relative to the direction of operation of motor rotor shaft 14 to cause wiper operation through flexible shafting 3 connected to output clutch drum 18 and to the motion converter and gearing mechanism unit 4, so long as the motor M (in casing 1) is energized for operation and so long as the control sleeve and clutch spring assembly 22 is free to turn with the clutch drums 16 and 19. If the control assembly 22 is prevented from so turning with the clutch drums, then the clutch spring is de-energized, which is to say that the spring coils around the input or driving drum surface portion 20 of drum member 16 are sufficiently expanded out of gripping contact therewith to permit drum member 16 to overrun drum member 18. Friction brake mechanism 30, as operated by its controls to be further described below, stops rotation of control sleeve and clutch spring assembly 22, hence stops transmission of torque by the motor to output drum member 18 for parking of the wiper W, Fig. 1. The spring clutch mechanism or assembly 15, as shown, further includes a pilot or auxiliary aligning bearing 29 for motor rotor shaft portion 14 and driven clutch drum member 18 in an axial bore of that drum member.

Brake mechanism 30 in housing 2 comprises, as shown in Figs. 2 and 3, a pair of substantially identical metal brake shoe members 32 pivotally interconnected by a suitable hinge construction 33 including a pin 34 in housing 2 below the clutch assembly 15. Shoe members 32 are preferably faced at 32a with friction material (e. g. synthetic rubber) at the portions of the shoe members which lie peripherally adjacent the friction sleeve 27 of rotary control sleeve etc. assembly 22. Relatively opposite wall portions of housing 2 (see Fig. 2) detachably support adjacent ends of a brake shoe guide pin 35 which passes somewhat loosely through elongated slots 32' in the respective brake shoe members 32. Brake shoe operating coil compression springs 36 are supported by the guide pin 35 and are preloaded, by associated housing walls, axially of the springs, against relatively oppositely facing surfaces of the brake shoe members 32 for clutch de-energizing operation of the brake mechanism. Two generally parallel upper end arm portions 32'' of brake shoe members 32 are (during continued wiping operation of the present mechanism generally) forced apart by a cam 38 on a vertical shaft 39 supported for limited angular movement by a housing assembly 40 (Figs. 1 and 3) secured to the top side of housing 2 and forming an upper closure for the interior of housing 2.

Housing assembly 40, Figs. 1 and 3, has, inside it, a known type of solenoid mechanism (not shown but being marketed by G. E. Leland Inc., Dayton, Ohio, under the proprietary name "Ledex"). When solenoid coil B, shown in Fig. 5 only, is energized, the cam 38 is rotated through movement of the solenoid armature about the axis of cam-supporting shaft 39 through a sufficient angle (see Figs. 2 and, particularly, 4) to release the brake shoes 32 from rotation-restraining (i. e. spring-clutch-de-energizing) frictional contact with the light weight control sleeve and clutch spring assembly 22, permitting the clutch spring 19 immediately to grip its two drum surfaces 20 and 21 to drive the wiper. Solenoid coil B, as will later be shown, is energized by wiper-motor-operating electric current, but only during normal operation of the motor M, being de-energized simultaneously with motor de-energization.

The friction necessarily involved in a large amount of speed reduction and motion conversion in housing 4, added to the friction of the wiper blade on the windshield is sufficient to assure arrest and effectual locking of the wiper blade in whatever position the blade has assumed at the instant the spring clutch 15 is de-energized. The high rotational speed of the motor shaft 14 permits the flexible shafting 3 and other input portions of the gearing (in housing 4) to be of greatly reduced size and mass as compared to counterparts of direct current powered motor and wiper driving equipment with equivalent heavy duty wiper blade and drive arm mechanism as required for modern aircraft use.

The reduction gearing and motion converter mechanism inside housing 4, Fig. 1, can, in essential principles, be according to C. R. Sacchini Patent 2,560,000 issued to the assignee hereof July 10, 1951. In Fig. 3 of that patent a cam 41 is shown connected to wiper drive shaft 35 for opening the contacts of an electric switch 44 whenever the wiper blade is moved by the shaft to a position suitable for parking of the blade. Wiper drive shaft 4' hereof (Fig. 1) has a similar switch-contact-operating cam 4'' and associated electric switch contact 57, shown only diagrammatically in Fig. 5 hereof. The operation of cam 4'' and switch contact 57 is described below.

The electrical diagram, Fig. 5, shows more or less conventionally an alternator A with a grounded neutral terminal 44 and current output lines 45, 46 and 47 connected respectively to three of four mechanically interconnected movable switch elements or contacts 48 included in a four-pole, spring centered, reversing relay mechanism 50 of suitable type and design. Operating coils or electro-magnets HR and LR of the relay mechanism 50 are electrically connected with conductors 51, 52 and 53 (latter shown connected at 54 to an output line of the alternator A). The coils HR and LR have armatures (not shown) mechanically connected to each other and to all of the contacts 48. The upper three of the four relay operated contacts 48 selectively couple the alternator output lines 45, 46 and 47 to the high speed winding HSW and low speed winding LSW of wiper motor M, through respective motor-winding-connected lines H and L, as a result of moving a manually operated control switch contact C, shown ground-connected at G1, respectively to its two dotted-line-illustrated "on" positions CH and CL. Wiper parking and complete shutdown result primarily from movement of contact C to its full-line-illustrated (shutdown-initiating) or "off" position, but the parking operation and shutdown can be completed only when the wiper has reached the proper parking position in its stroke. If contact C is moved to the shutdown-initiating position at a time when the wiper is in other than its proper parking position, a separately grounded holding circuit portion 55 (forming part of the relay mechanism circuit, via lowermost relay operated contact 48), which circuit portion 55 is controlled solely by wiper connected cam 4'' through associated cam-operated contact 57, maintains energized whichever relay coil (HR or LR) has been functioning until the wiper is in the proper parking position, and then the motor-winding-connected lines (H or L) are de-energized through spring centering operation of the relay as a result of breaking of the holding circuit portion 55 at contact 57.

It will be apparent from the above, with reference to Fig. 5, that manual control contact C can ordinarily be moved to change from one motor speed to the other without stopping the wiper motor M since usually the wiper will not be in proper parking position (necessary to open contact 57) when the control contact C is moved through its shutdown-initiating or intermediate position in changing speeds. The arrangement, as will also be apparent, permits manipulation of control contact C from either speed selecting position (CH or CL) directly to off or shutdown-initiating position, i. e. without having to change speed selection.

Solenoid B, shown ground-connected at 59 Fig. 5, is energized by direct current supplied by a dual rectifier system in rectifier unit 60. The separate rectifiers 62 and 64 have a common output connection with solenoid B, the rectifier inputs are connected, as shown, respectively with a pair of the motor lines H and L, so that the solenoid B will be energized through operation of the four pole reversing relay 50 at each selected motor speed. Filter capacitor 63 of unit 60 is grounded at 65. The diagrammatically illustrated arrangement enables safe and dependable use of now readily available direct current solenoid mechanisms of proven capabilities, for control of the brake and clutch mechanisms 15 and 30, and avoids having to provide an additional movable switch element 48 in relay 50 for solenoid energization and de-energization simultaneously with effecting the described electrical control of motor M.

I claim:

1. An electric motor driven windshield wiper mechanism and control therefor, comprising an electric motor and energizing electric circuit connected thereto, the motor having a rotary output member, reduction gear mechanism having a rotary input member concentric with and rotatable relative to said motor output member, the gear mechanism having output means including a wiper which is moved cyclically away from and back to a parking position, normally closed electrical contacts arranged to be opened as a function of movement of the wiper by the gear mechanism to the parking position, an over-running self energized clutch coupling between the motor output member and said gear mechanism input member, electromagnetically operated means connected in said circuit and operating to condition the clutch for torque transmission to the gear mechanism input member when and only when the electromagnetically operated means is energized by the circuit, manual control switch means in said circuit operable between "on" and "off" positions in which the motor and said means can be energized and de-energized respectively through said circuit, said circuit including a holding circuit portion connected to be controlled solely by said normally closed electrical contacts in a manner to prevent de-energization of the motor and electromagnetically operated means by the manual control means except when said normally closed contacts are open in the parking position of the wiper.

2. The mechanism according to claim 1, wherein the motor is a polyphase alternating current motor having low speed winding and high speed winding, and the manual control switch means has two "on" positions operable through a multiple contact relay mechanism to cause energization of the motor for operation at selected speeds.

3. An electric motor driven windshield wiper mechanism and control therefor, comprising an electric motor and an energizing electric circuit connected thereto, the motor having a rotary output member, reduction gear mechanism having a rotary input member concentric with and rotatable relative to said motor output member, the gear mechanism having output means including a wiper, an overrunning self energizing clutch including a helical friction spring preloaded for self energization on a pair of concentric relatively rotatable drum surfaces connected respectively to the motor output member and to said gear mechanism input member, a rigid sleeve of circular cross section journalled for rotation with the drum surfaces during clutch operation and connected to the helical spring for de-energizing the clutch, a self acting brake arranged frictionally to engage the sleeve and prevent its rotation, electromagnetically operated means connected in said circuit and operating, when energized, to hold the brake released from the clutch sleeve and permit torque transmission by the clutch to the gear mechanism input member, and circuit control means including manual control switch means in said circuit operable between "on" and "off" positions in which the motor and said electromagnetically operated means can be simultaneously energized and simultaneously de-energized, respectively, through said circuit.

4. An electric motor driven windshield wiper mechanism and control therefor, comprising an electric motor and an energizing electric circuit connected thereto, the motor having a rotary output member, reduction gear mechanism having a rotary input member concentric with and rotatable relative to said motor output member, the gear mechanism having output means including a wiper which is moved cyclically away from and back to a parking position, normally closed electrical contacts arranged to be opened as a function of movement of the wiper by the gear mechanism to the parking position, an overrunning self energizing clutch including a helical friction spring preloaded for self energization on a pair of concentric relatively rotatable drum surfaces connected respectively to the motor output member and to said gear mechanism input member, a rigid sleeve of circular cross section journalled for rotation with the drum surfaces during clutch operation and connected to the helical spring for de-energizing the clutch, a self acting brake arranged frictionally to engage the sleeve and prevent its rotation, electromagnetically operated means connected in said circuit and operating to hold the brake released from the clutch sleeve and permit torque transmission by the clutch to the gear mechanism input member when and only when the electromagnetically operated means is energized by the circuit, manual control switch means in said circuit operable between "on" and "off" positions in which the motor and said means can be energized and de-energized respectively through said circuit, said circuit including a holding circuit portion connected to be controlled solely by said normally closed electrical contacts in a manner to prevent de-energization of the motor and electromagnetically operated means by the manual control means except when said normally closed contacts are open in the parking position of the wiper.

References Cited in the file of this patent
UNITED STATES PATENTS

| | | |
|---|---|---|
| 2,528,181 | Sacchini | Oct. 31, 1950 |
| 2,761,537 | Short | Sept. 4, 1956 |